(12) United States Patent
Sawyers-Abbott

(10) Patent No.: US 10,486,820 B2
(45) Date of Patent: Nov. 26, 2019

(54) BLOCKER DOOR LINK ARM AND FITTING

(71) Applicant: United Technologies Corporation, Hartford, CT (US)

(72) Inventor: Nigel David Sawyers-Abbott, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 858 days.

(21) Appl. No.: 15/131,933

(22) Filed: Apr. 18, 2016

(65) Prior Publication Data

US 2017/0297730 A1    Oct. 19, 2017

(51) Int. Cl.
*B64D 29/06* (2006.01)
*B64D 27/10* (2006.01)
*F02K 1/70* (2006.01)
*F02K 1/76* (2006.01)
*F02K 1/72* (2006.01)
*F16C 11/04* (2006.01)

(52) U.S. Cl.
CPC ............ *B64D 29/06* (2013.01); *B64D 27/10* (2013.01); *F02K 1/70* (2013.01); *F02K 1/72* (2013.01); *F02K 1/763* (2013.01); *F16C 11/045* (2013.01); *F05D 2260/31* (2013.01); *F05D 2260/50* (2013.01); *F16C 2360/23* (2013.01); *Y02T 50/672* (2013.01)

(58) Field of Classification Search
CPC .......... B64D 29/06; B64D 27/10; F02K 1/70; F02K 1/72; F02K 1/763; F05D 2260/31; F16C 11/045; F16C 11/0619
USPC ........................................................ 60/226.2
See application file for complete search history.

(56) References Cited

U.S. PATENT DOCUMENTS

| 4,605,186 A | 8/1986 | Fernz | |
|---|---|---|---|
| 5,110,069 A * | 5/1992 | Webb | B64C 25/423 239/265.29 |
| 2010/0270428 A1 | 10/2010 | Murphy | |
| 2013/0219857 A1 | 8/2013 | Zysman | |
| 2015/0016965 A1 * | 1/2015 | Sawyers-Abbott | F02K 1/72 415/148 |
| 2015/0308381 A1 * | 10/2015 | Byrne | F02K 1/763 60/226.2 |

* cited by examiner

FOREIGN PATENT DOCUMENTS

WO      8401344      4/1984

OTHER PUBLICATIONS

EP Search report dated Sep. 15, 2017 in EP Application No. 17166920.3.

*Primary Examiner* — Thai Ba Trieu
*Assistant Examiner* — Loren C Edwards
(74) *Attorney, Agent, or Firm* — Snell & Wilmer, L.L.P.

(57) ABSTRACT

Systems for thrust reverser link arm connections are described herein. A linkage system for a nacelle may comprise a thrust reverser link arm and a fitting. The fitting may comprise a base plate configured to be fastened to a proximal surface of an inner fixed structure (IFS), a first wall extending orthogonally from the base plate, a second wall extending orthogonally from the base plate, and a pin extending orthogonally from the first wall and extending orthogonally from the second wall. A first end of the thrust reverser link arm may comprise a removable member, the removable member having an inner surface comprising a semi-circle, the inner surface configured to seat against the pin. The removable member may be removed from the linkage system from a radially outward side of the IFS.

19 Claims, 8 Drawing Sheets

BLOCKER DOOR LINK ARM AND FITTING

FIELD

This disclosure relates generally to gas turbine engines, and more particularly to thrust reverser assemblies for gas turbine engines.

BACKGROUND

Generally, a thrust reverser blocker door link arm attaches to a fan duct inner fixed structure (IFS) via a fitting attached to the surface of the IFS. The thrust reverser blocker door may rotate about the fitting to a deployed position, blocking fan duct air and causing reverse thrust. These features (i.e., the fitting and the link arm) may cause duct losses and may reduce thrust specific fuel consumption (TSFC).

SUMMARY

A nacelle for a gas turbine engine may comprise an inner fixed structure (IFS), a link arm having a removable member accessible from a bypass flow-path, and a fitting for the link arm, the fitting being attached to a proximal surface of the IFS. The fitting may comprise a base plate attached to the proximal surface of the IFS, and a pin, wherein the link arm is configured to pivotally rotate about the pin.

In various embodiments, the base plate may be attached to the proximal surface of the IFS via a plurality of fasteners. The link arm may comprise a thrust reverser link arm. The plurality of fasteners may be accessible for removal from a radially inward side of the IFS. The fitting may further comprise a first supporting wall extending orthogonal from the base plate, and a second supporting wall extending orthogonal from the base plate. The pin may be coupled to the first supporting wall and coupled to the second supporting wall, the pin extending between the first supporting wall and the second supporting wall. The link arm may be located between the first supporting wall and the second supporting wall in response to the link arm being in an installed position. A first end of the link arm comprises the removable member, the removable member configured to be attached to the link arm via a fastener to prevent the link arm from detaching from the pin, wherein the fastener is removable from a radially outward side of the IFS. The removable member may comprise an inner surface comprising a semi-cylinder. The inner surface may be configured to seat against the pin in response to the link arm being in the installed position.

A linkage system for a nacelle may comprise a link, and a fitting. The fitting may comprise a base plate configured to be fastened to a proximal surface of an inner fixed structure (IFS), a first wall extending orthogonally from the base plate, a second wall extending orthogonally from the base plate, and a pin extending orthogonally from the first wall and extending orthogonally from the second wall.

In various embodiments, the link may comprise a first end configured to be coupled to the pin and a second end configured to be coupled to a thrust reverser blocker door. The first end may comprise a removable member configured to be fastened to the first end via a plurality of fasteners. The removable member may comprise an inner surface comprising a semi-circle configured to seat against the pin. The removable member may be configured to be accessibly removed from a radially outward side of the IFS.

A nacelle arrangement may comprise an IFS, a thrust reverser blocker door, a thrust reverser link arm coupled to the thrust reverser blocker door, and a fitting coupled to the thrust reverser link arm, the fitting being attached to a proximal surface of the IFS. The fitting may comprise a base plate configured to be fastened to the proximal surface of the IFS, a first wall extending orthogonally from the base plate, a second wall extending orthogonally from the base plate, and a pin extending orthogonally from the first wall and extending orthogonally from the second wall.

In various embodiments, a first end of the thrust reverser link arm may be rotatably coupled to the fitting and a second end of the thrust reverser link arm may be rotably coupled to the thrust reverser blocker door. The first end of the thrust reverser link arm may comprise a removable member, the removable member having an inner surface comprising a semi-circle, the inner surface configured to seat against the pin. The first end of the thrust reverser link arm may comprise an aperture configured to circumferentially surround the pin in response to the removable member being in an installed position. The removable member may be attached to the first end via a plurality of fasteners, the plurality of fasteners configured to be installed from a radially outward side of the IFS.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
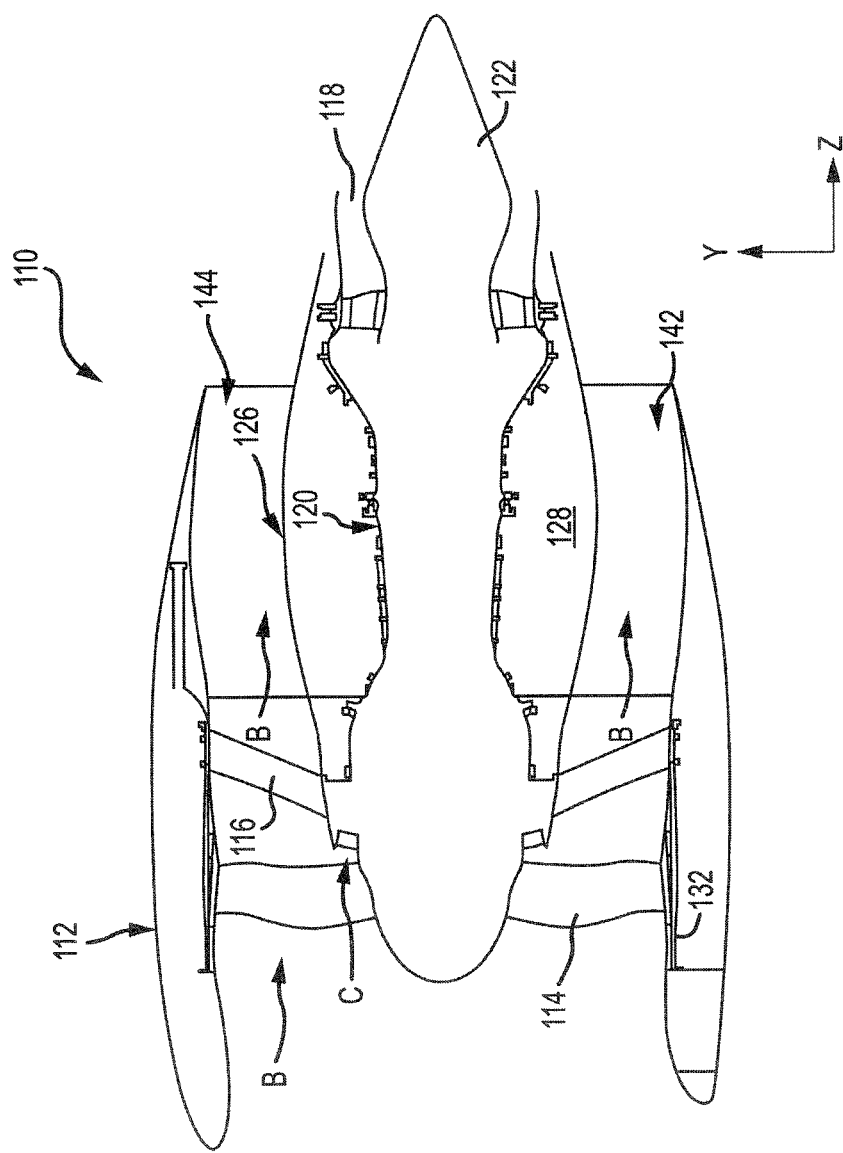
FIG. 1 illustrates a gas turbine engine, in accordance with various embodiments.

FIG. 1 illustrates a schematic view of a gas turbine engine, in accordance with various embodiments. An xyz-axis is provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
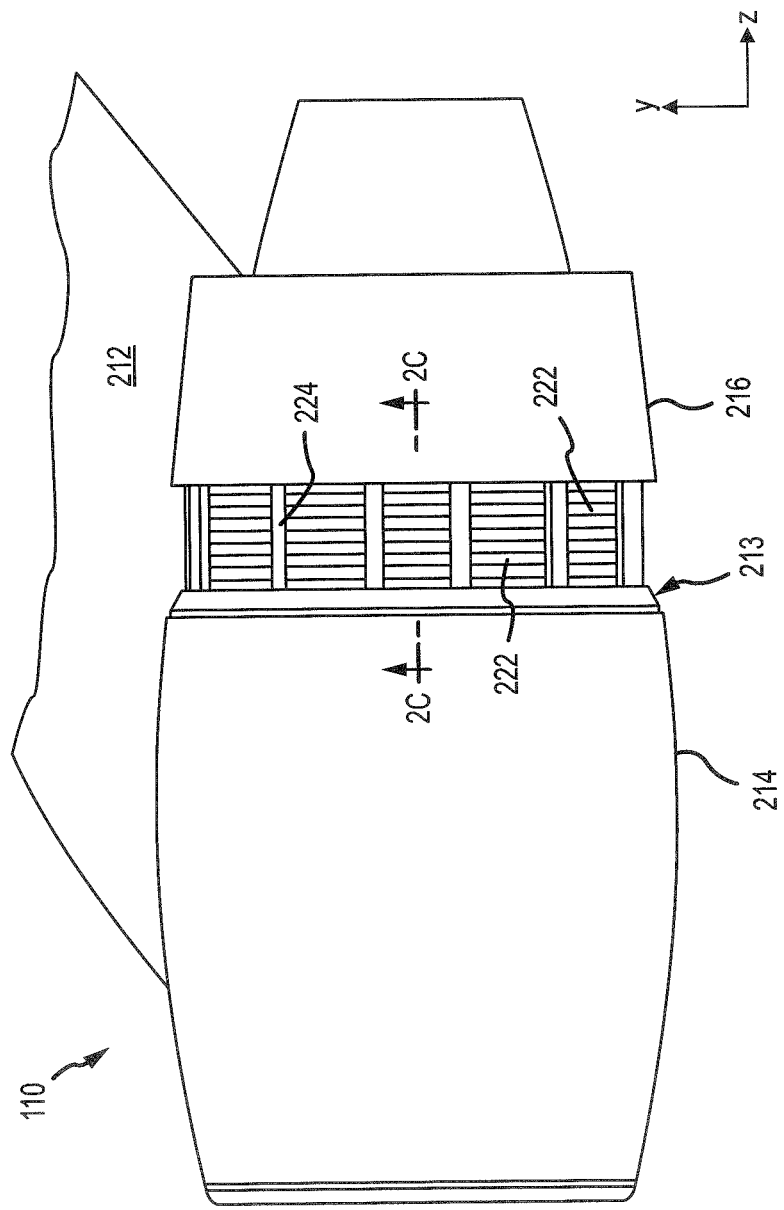
FIG. 2A illustrates a side view of a gas turbine engine, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (see FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
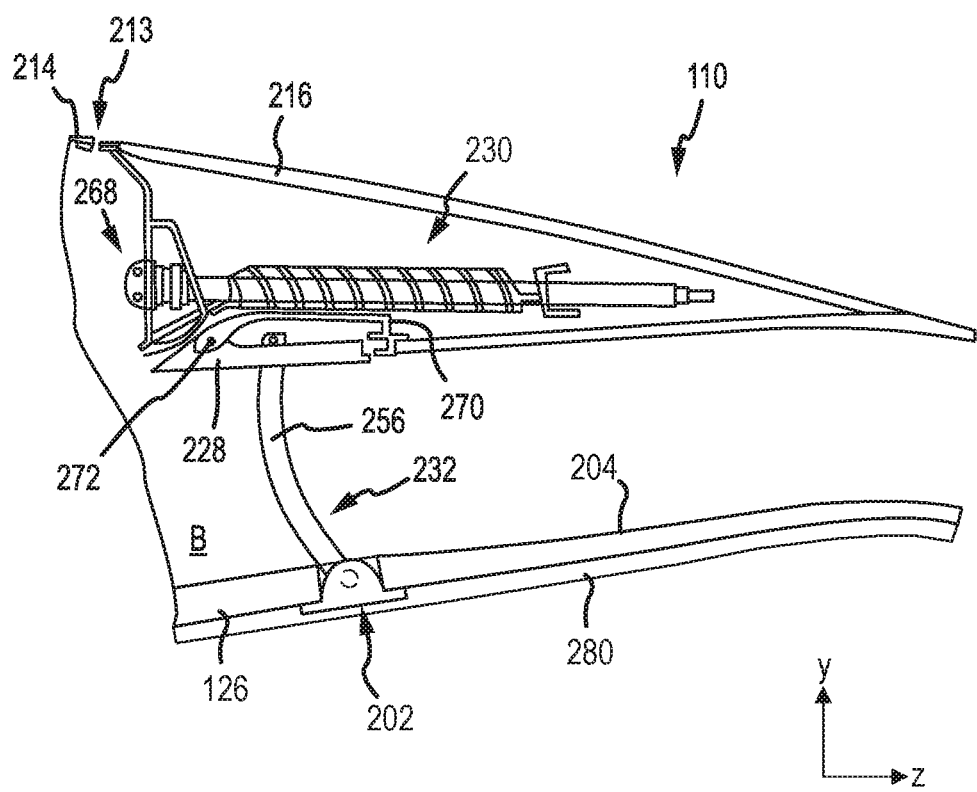
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is just one of many cascade vane sets 222 disposed circumferentially around gas turbine engine 110 as shown in FIG. 2A. An actuator 268 may be disposed between these sets of cascades in order to drive translating cowl 216 rearward. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 are spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket means 270. In various embodiments, bracket means 270 and translating cowl 216 may comprise a single, unitary member. Pivot 272 may be a hinge attachment between blocker door 228 and bracket means 270. In various embodiments, blocker door 228 may be engaged directly to translating cowl 216 through a hinge attachment. Pivot 272 may allow blocker door 228 to rotate as translating cowl 216 moves from a stowed position to a deployed position.

A linkage system 232 may be coupled between IFS 126 and blocker door 228. Linkage system 232 may include fitting arrangement (also referred to herein as fitting) 202 and link (also referred to herein as a link arm, or a thrust reverser link arm) 256. Fitting 202 may be coupled to IFS 126. Link 256 may be configured to pivot about fitting 202. Stated another way, first end 252 of link 256 may be rotatably coupled to fitting 202. Second end 254 of link 256 may be rotatably coupled to blocker door 228.

In various embodiments, a thermal layer 280 may be installed onto a proximal side of IFS 126. Thermal layer may comprise a thermal protection to IFS 126 from components located radially inward from thermal layer 280. Thermal layer 280 may cover fitting 202 after being installed. Thus, fitting 202 may be installed onto IFS 126 before installing thermal layer 280.

Fitting 202 may extend through an aperture disposed in IFS 126 such that fitting 202 does not extend into bypass flow-path B, allowing a more efficient flow of bypass air in bypass flow-path B. Stated another way, fitting 202 may be located such that fitting 202 does not extend radially outward of distal surface (also referred to herein as flow surface) 204 of IFS 126. In this manner, the thrust specific fuel consumption (TSFC) of the gas turbine engine onto which fitting 202 is installed may be increased, in accordance with various embodiments.

Figure 2C:
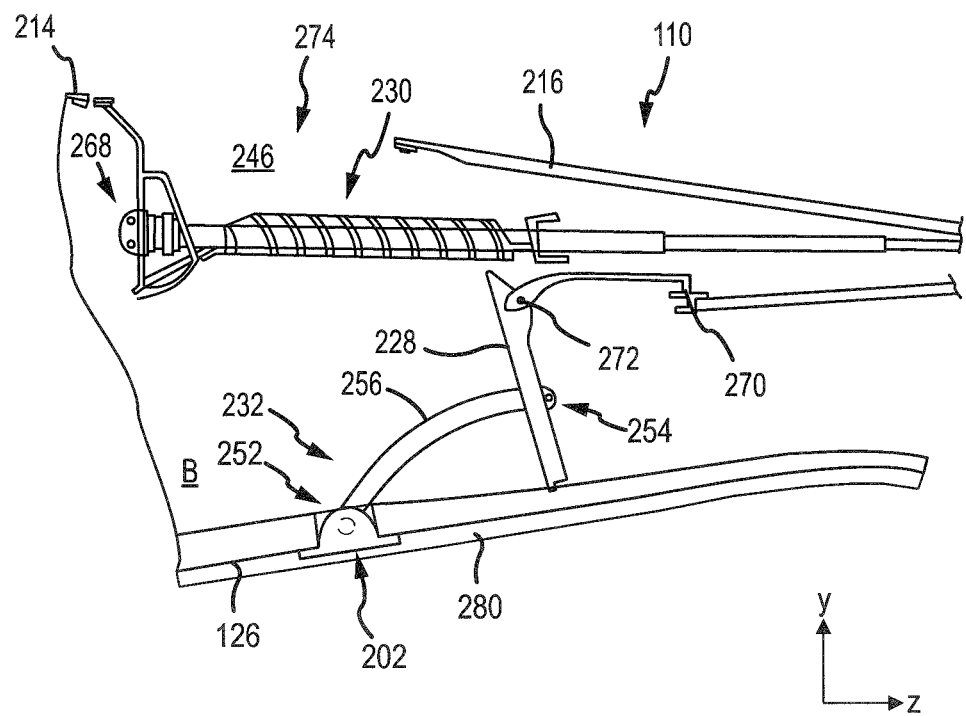
FIG. 2C illustrates a cross-section view of gas turbine engine with a blocker door in a deployed position, in accordance with various embodiments.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system 232 are responsive to translation of translating cowl 216 during a thrust reversing sequence. As noted above and with momentary additional reference to FIG. 1, FIG. 2B shows a normal or cruise mode where fan air is directed through bypass flow path B. When in reverse thrust mode or deployed position, shown in FIG. 2C, bypass flow path B is blocked by a ring of blocker doors 228, interposed within bypass flow path B and collectively having a complementary geometric configuration with respect thereto, for diversion of fan air into bypass duct 246. The reverse thrust mode is achieved by aft or rearward movement of translating cowl 216, thereby exposing outlet port 274 for airflow to escape through after the air passes into bypass duct 246.

Figure 3A:
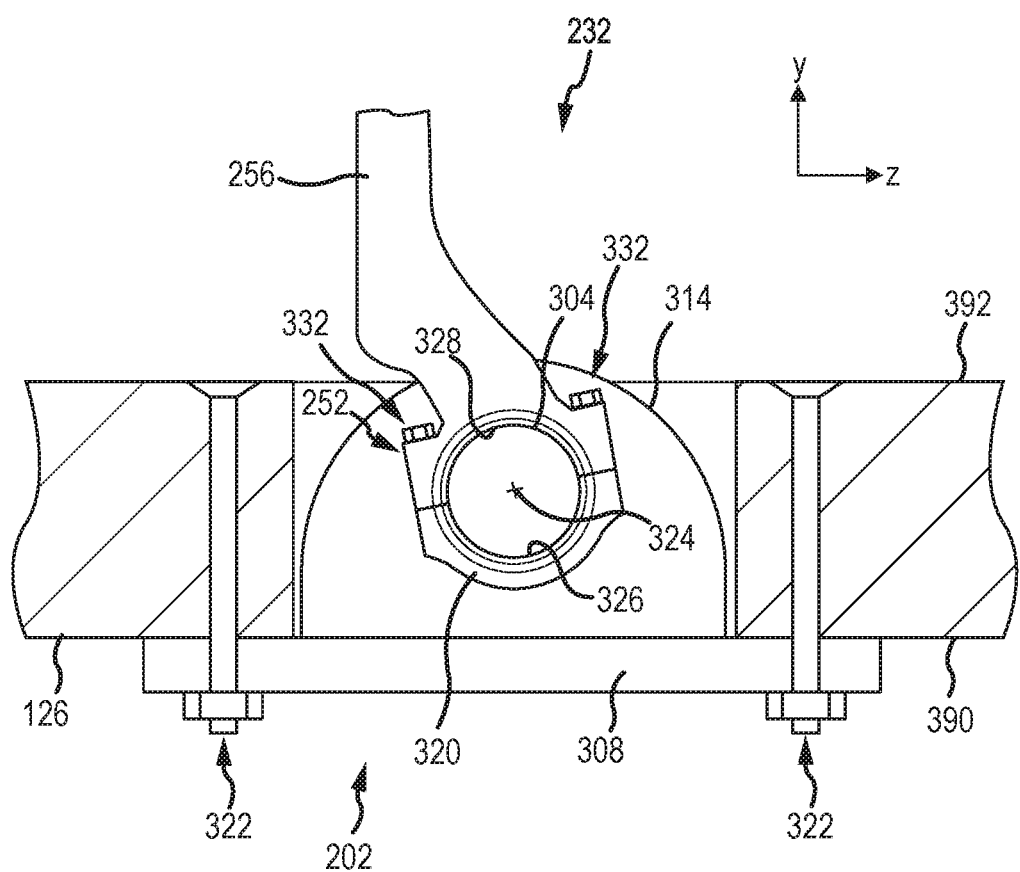
FIG. 3A illustrates a close-up, cross-sectional view of a fitting coupled to a link in a normal cruise mode, in accordance with various embodiments.
Figure 3B:
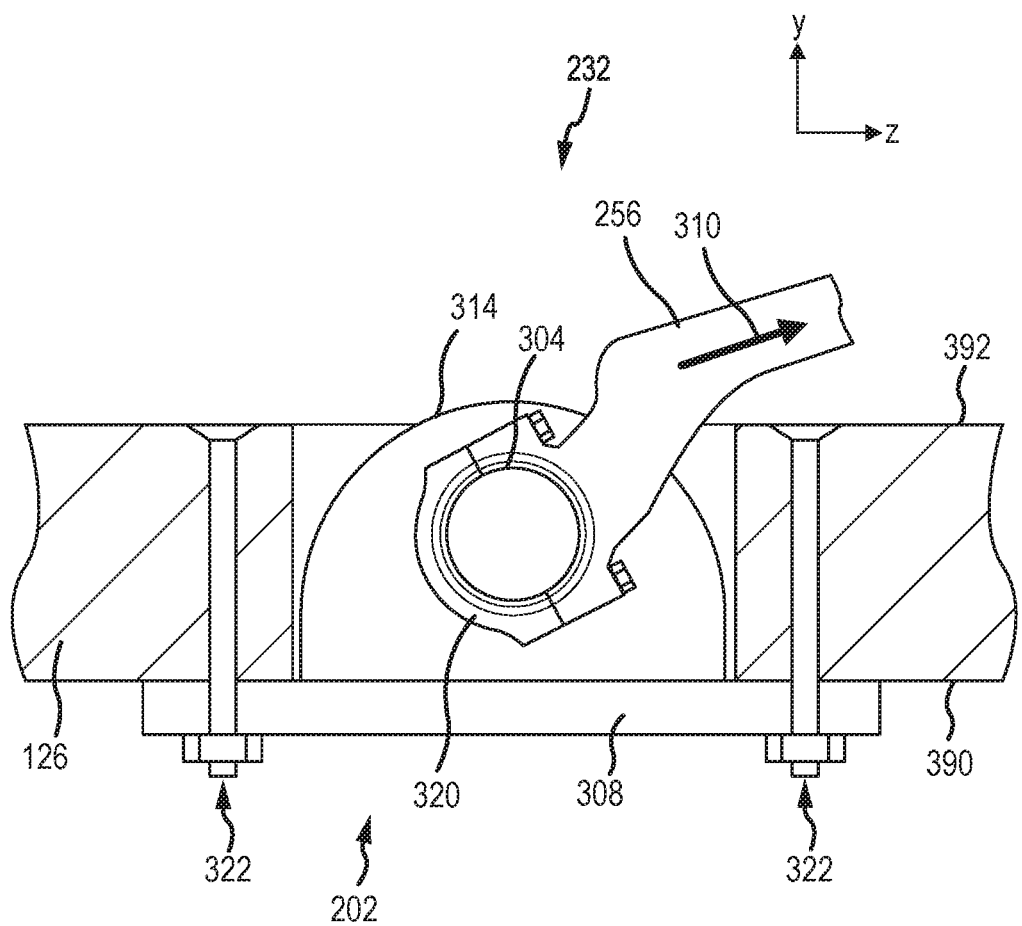
FIG. 3B, illustrates a close-up, cross-sectional view of a fitting coupled to a link in a reverse thrust mode, in accordance with various embodiments.

With respect to FIG. 3A and FIG. 3B, elements with like element numbering, as depicted in FIG. 2B and FIG. 2C, are intended to be the same and will not necessarily be repeated for the sake of clarity.

With reference to FIG. 3A, a close-up, cross-sectional view of fitting 202 coupled to link 256 in a normal cruise mode is illustrated, in accordance with various embodiments. A yz-axis is provided for ease of illustration. Fitting 202 may include pin 304, base plate 308, a wall (also referred to herein as a first wall or a first supporting wall) 312 (see FIG. 4), and wall (also referred to herein as a second wall or a second supporting wall) 314.

Figure 4:
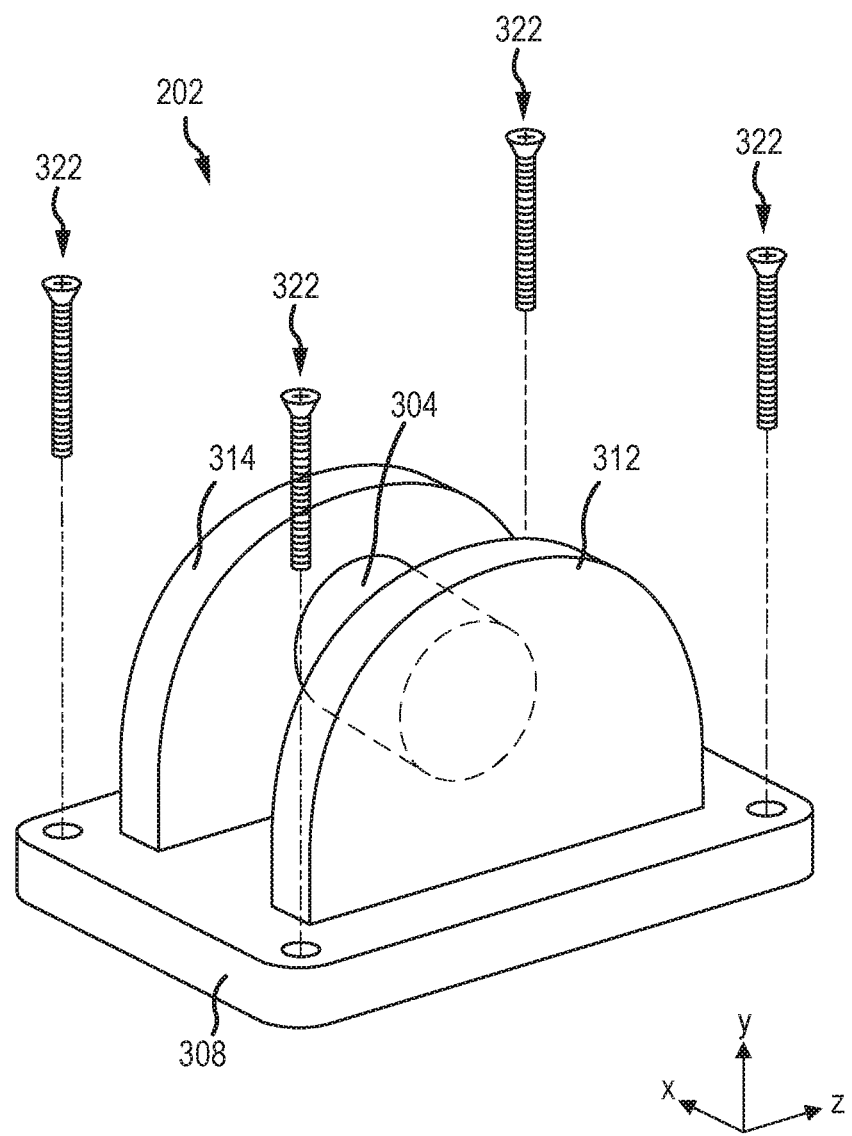
FIG. 4 illustrates a perspective view of a fitting having a plurality of fasteners, in accordance with various embodiments.

With respect to FIG. 4, elements with like element numbering, as depicted in FIG. 3A and FIG. 3B, are intended to be the same and will not necessarily be repeated for the sake of clarity.

With reference to FIG. 4, a perspective view of fitting 202 is illustrated, in accordance with various embodiments. An xyz-axis is provided for ease of illustration. First wall 312 and second wall 314 may extend from base plate 308. First wall 312 and second wall 314 may extend orthogonally from base plate 308. First wall 312 and second wall 314 may extend in a radially outward or distal direction when fitting 202 is in an installed position as illustrated in FIG. 3A. Pin 304 may extend between first wall 312 and second wall 314. In various embodiments, first wall 312, second wall 314 and pin 304 may comprise a single unitary member. In various embodiments, pin 304 may be welded to first wall 312 and second wall 314. However, any means of connecting or assembling pin 304 to first wall 312 and second wall 314 is contemplated herein. For example, pin 304 may comprise a fastener, such as a threaded bolt or pin for example, threadingly coupled to first wall 312 and/or second wall 314.

With reference now to FIG. 3A, link 256 may rotate about pin 304 in the clockwise direction when moving from the normal cruise mode to the reverse thrust mode, as shown in FIG. 3A and FIG. 3B. Thus, link 256 may pivotally rotate about pin 304. First end 252 of link 256 may comprise a removable member 320. Removable member 320 may comprise an inner surface 326. Inner surface 326 may comprise a semi-circle or a semi-cylinder. First end 252 of link 256 may comprise an inner surface 328 comprising a semi-circle or semi-cylinder. Thus, removable member 320 and link 256 may form an aperture 324 (with reference numeral 324 pointing to the center of said aperture) when in the installed position relative to one another. Inner surface (also referred to herein as first inner surface) 328 and inner surface (also referred to herein as second inner surface) 326 may seat against pin 304 when in an installed position. Removable member 320 may surround at least a portion of pin 204. In various embodiments, first end 252 may perimetrically surround pin 304. In various embodiments, first end 252 may circumferentially surround pin 304. Removable member 320 may be fastened to first end 252 via a plurality of fasteners. Thus, removable member 320 may prevent link 256 from detaching from pin 304.

IFS 126 may comprise a proximal surface 390 and a distal surface 392. Base plate 308 may be attached to proximal surface 390 of IFS 126. Base plate 308 may be attached to proximal surface 390 of IFS 126 via a plurality of fasteners 322. Plurality of fasteners 322 may be accessible from a radially inward side of IFS 126. Thus, fitting 202 may be installed onto IFS 126 from the radially inward side of IFS 126.

Figure 5:
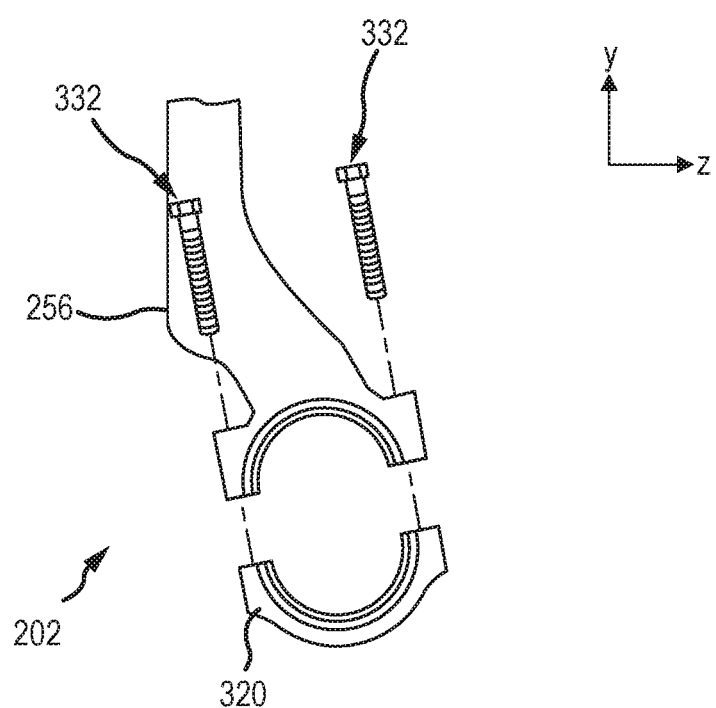
FIG. 5 illustrates an exploded view of a thrust-reverser link arm, in accordance with various embodiments.

With added reference to FIG. 5, to remove removable member 320, fasteners 332 may be accessed from the radially outward or distal side of IFS 126 and may be removed. Then, link 256 may be removed from pin 304 and removable member may be removed from pin 304. Thus, removal of removable member 320 and link 256 may be achieved from the radially outward side of IFS 126. Stated another way, removable member 320 may be removably accessible, or otherwise removable, from a radially outward side of IFS 126. In this manner, removable member 320 may be removed from fitting 202 without having to remove or otherwise reposition any portion of thermal layer 280 (see FIG. 2B), in accordance with various embodiments. Furthermore, removable member 320 may be removed from fitting 202 without having to open the thrust reverser or thrust reverser blocker door, in accordance with various embodiments. Stated another way, the removable member 320 may be removable from fitting 202 in response to a thrust reverser of the link 256 being in a closed position.

With reference to FIG. 3B, a close-up, cross-sectional view of fitting 202 coupled to link 256 in a reverse thrust mode is illustrated, in accordance with various embodiments. Link 256 may experience load 310 when in the reverse thrust mode as compared to normal cruise mode. Load 310 may comprise a high load. Load 310 may be mostly in the aft direction (z-direction). With momentary reference to FIG. 2C, load 310 may be from air in bypass flow path B pushing against thrust reverser blocker door 228. Thus, in various embodiments, load 310 may be transferred from link 256, into pin 304, into first wall 312 (see FIG. 4) and second wall 314, into base plate 308, and into IFS 126.

With reference to FIG. 3A and FIG. 4, link 256 may be located between first wall 312 and second wall 314 in response to link 256 being in an installed position as illustrated in FIG. 3A.

In various embodiments, fitting 202 may comprise a metal such as a steel alloy, stainless steel, titanium, aluminum, or any other metal. In various embodiments, fitting 202 may comprise a composite material. Pin 304 may comprise steel or stainless steel. In various embodiments, pin 304 may comprise aluminum. Pin 304 may include a steel sleeve in response to pin 304 comprising aluminum.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nacelle for a gas turbine engine comprising:
an inner fixed structure (IFS);
a link arm comprising a removable member accessible from a bypass flow-path; and
a fitting for the link arm, the fitting being attached to a proximal surface of the IFS, the fitting comprising:
a base plate attached to the proximal surface of the IFS; and
a pin, wherein the link arm is configured to pivotally rotate about the pin and the removable member couples the link arm to the pin,
wherein a first end of the link arm defines an aperture, the pin is disposed at least partially in the aperture, the aperture is partially defined by the removable member and partially defined by the link arm, and
the removable member is configured to be attached to the link arm via a removable member fastener to prevent the link arm from detaching from the pin, wherein the removable member fastener is removable from the bypass flow-path.

2. The nacelle of claim 1, wherein the base plate is attached to the proximal surface of the IFS via a plurality of fasteners.

3. The nacelle of claim 2, wherein the plurality of fasteners are accessible for removal from a radially inward side of the IFS.

4. The nacelle of claim 1, wherein the removable member comprises a second inner surface comprising a second semi-cylinder.

5. The nacelle of claim 4, wherein the second inner surface is configured to seat against the pin in response to the link arm being in the installed position.

6. The nacelle of claim 4, wherein the first end of the link arm comprises a first inner surface comprising a first semi-circle.

7. The nacelle of claim 1, wherein the fitting further comprises:
a first supporting wall extending orthogonal from the base plate, and
a second supporting wall extending orthogonal from the base plate.

8. The nacelle of claim 7, wherein the pin is coupled to the first supporting wall and coupled to the second supporting wall, the pin extending between the first supporting wall and the second supporting wall.

9. The nacelle of claim 8, wherein the link arm is located between the first supporting wall and the second supporting wall in response to the link arm being in an installed position.

10. A linkage system for a nacelle comprising:
a link, a first end of the link comprises a removable member; and
a fitting comprising:
a base plate configured to be fastened to a proximal surface of an inner fixed structure (IFS);
a first wall extending orthogonally from the base plate;
a second wall extending orthogonally from the base plate; and
a pin extending orthogonally from the first wall and extending orthogonally from the second wall, wherein the removable member couples the link to the pin,
wherein a first end of the link defines an aperture, the pin is disposed at least partially in the aperture, the aperture is partially defined by the removable member and partially defined by the link, and
the removable member is configured to be attached to the link via a removable member fastener to prevent the link from detaching from the pin, wherein the removable member fastener is accessible at an opposite side of the pin from the removable member.

11. The linkage system of claim 10, wherein the first end is configured to be coupled to the pin and a second end of the link is configured to be coupled to a thrust reverser blocker door.

12. The linkage system of claim 11, wherein the first end of the link comprises an aperture configured to circumferentially surround the pin in response to the removable member being in an installed position, wherein the aperture is partially defined by the removable member and partially defined by the link, and wherein the removable member is configured to be fastened to the first end via a plurality of fasteners.

13. The linkage system of claim 12, wherein the removable member comprises a second inner surface comprising a second semi-circle.

14. The linkage system of claim 13, wherein the removable member is configured to be accessibly removed from a radially outward side of the IFS.

15. The linkage system of claim 13, wherein the first end of the link comprises a first inner surface comprising a first semi-circle.

16. A nacelle arrangement comprising:
an inner fixed structure (IFS);
a thrust reverser blocker door;
a thrust reverser link arm coupled to the thrust reverser blocker door, a first end of the thrust reverser link arm comprises a removable member;
a fitting coupled to the thrust reverser link arm, the fitting being attached to a proximal surface of the IFS, the fitting comprising:
 a base plate configured to be fastened to the proximal surface of the IFS;
 a first wall extending orthogonally from the base plate;
 a second wall extending orthogonally from the base plate; and
 a pin extending orthogonally from the first wall and extending orthogonally from the second wall, wherein the removable member couples the thrust reverser link arm to the pin,
wherein a first end of the thrust reverser link arm defines an aperture, the pin is disposed at least partially in the aperture, the aperture is partially defined by the removable member and partially defined by the thrust reverser link arm, and
the removable member is configured to be attached to the thrust reverser link arm via a removable member fastener to prevent the thrust reverser link arm from detaching from the pin, wherein the removable member fastener is removable from a bypass flow-path.

17. The nacelle arrangement of claim 16, wherein the first end of the thrust reverser link arm is rotatably coupled to the fitting and a second end of the thrust reverser link arm is rotatably coupled to the thrust reverser blocker door.

18. The nacelle arrangement of claim 17, wherein the first end of the thrust reverser link arm comprises an aperture configured to circumferentially surround the pin in response to the removable member being in an installed position, wherein the aperture is partially defined by the removable member and partially defined by the thrust reverser link arm, and wherein the removable member has an inner surface comprising a semi-circle.

19. The nacelle arrangement of claim 18, wherein the removable member is attached to the first end via a plurality of fasteners, the plurality of fasteners configured to be installed from a radially outward side of the IFS.

* * * * *